US012789543B2

(12) United States Patent
Tokonami et al.

(10) Patent No.: US 12,789,543 B2
(45) Date of Patent: Nov. 10, 2026

(54) SHEET DRYING APPARATUS AND IMAGE FORMING SYSTEM PROVIDED THEREWITH

(71) Applicant: KYOCERA Document Solutions Inc., Osaka (JP)

(72) Inventors: Minoru Tokonami, Osaka (JP); Mitsuhiro Goda, Osaka (JP); Hiroyuki Ueda, Osaka (JP); Masaki Murashima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 93 days.

(21) Appl. No.: 19/017,097

(22) Filed: Jan. 10, 2025

(65) Prior Publication Data

US 2025/0229556 A1 Jul. 17, 2025

(30) Foreign Application Priority Data

Jan. 17, 2024 (JP) ................................ 2024-005588

(51) Int. Cl.
*B41J 29/13* (2006.01)
*B41J 11/00* (2006.01)

(52) U.S. Cl.
CPC ......... *B41J 29/13* (2013.01); *B41J 11/00216* (2021.01); *B41J 11/00218* (2021.01); *B41J 11/006* (2013.01)

(58) Field of Classification Search
CPC ...... B41J 11/20; B41J 25/3086; B41J 11/002; B41J 11/00244; B66F 7/025; B29C 64/232; B33Y 10/00; G03G 15/202
See application file for complete search history.

(56) References Cited

U.S. PATENT DOCUMENTS 6,698,879 B1 * 3/2004 Hindriks ................ B41J 3/4078
347/105
11,884,088 B2 * 1/2024 Casey .................... B41J 11/007
(Continued)

FOREIGN PATENT DOCUMENTS

| | | |
|---|---|---|
| JP | H 08-150706 A | 6/1996 |
| JP | 2011-224932 A | 11/2011 |
| JP | 2022-148189 A | 10/2022 |

OTHER PUBLICATIONS

ESPACE Machine Translation of JP-2022148189-A, Retrieved Jun. 2026 (Year: 2026).*

(Continued)

*Primary Examiner* — John P Zimmermann
(74) *Attorney, Agent, or Firm* — Stein IP, LLC

(57) ABSTRACT

A sheet drying apparatus includes a conveyance portion, a drying portion, a main body frame accommodating the conveyance portion and the drying portion, an exterior cover attached to the main body frame, an inner cover, a locking mechanism, a temperature sensor, and a control portion. The drying portion is arranged opposite the conveyance portion and heats and dries a sheet on which an image has been formed with ink containing moisture. The inner cover can be opened and closed between the exterior cover and the drying portion. The locking mechanism locks the inner cover in a closed state. The temperature sensor senses the temperature in the drying portion. The control portion makes the locking mechanism lock the inner cover in the closed state until the temperature in the drying portion sensed by the temperature sensor falls below a first temperature.

4 Claims, 7 Drawing Sheets

(56) References Cited

U.S. PATENT DOCUMENTS

| | | | | |
|---|---|---|---|---|
| 12,545,035 | B2 * | 2/2026 | Kaneko | B41J 11/00216 |
| 2003/0043246 | A1 * | 3/2003 | Codos | B41J 2/01 347/102 |
| 2007/0227446 | A1 * | 10/2007 | Moon | B41J 3/28 118/663 |
| 2008/0024582 | A1 * | 1/2008 | Yokoyama | B41J 11/007 347/104 |
| 2009/0231404 | A1 * | 9/2009 | Niekawa | B41J 11/0021 347/102 |
| 2011/0261102 | A1 | 10/2011 | Kurasawa et al. | 347/16 |
| 2020/0164662 | A1 * | 5/2020 | Yamada | B41J 2/04563 |
| 2024/0300251 | A1 * | 9/2024 | Tsuchiya | B41J 11/0022 |

OTHER PUBLICATIONS

Extended European Search Report mailed Jun. 25, 2025, issued to European Application No. 25151851.0.

* cited by examiner

SHEET DRYING APPARATUS AND IMAGE FORMING SYSTEM PROVIDED THEREWITH

INCORPORATION BY REFERENCE

This application is based on and claims the benefit of priority from Japanese Patent Application No. 2024-005588 filed on Jan. 17, 2024, the contents of which are hereby incorporated by reference.

BACKGROUND

The present disclosure relates to a sheet drying apparatus that dries sheets on which images have been printed in an inkjet recording apparatus or the like, and to an image forming system provided with such a sheet drying apparatus.

As recording apparatuses such as facsimile machines, copiers, and printers, inkjet recording apparatuses, which form images by ejecting ink onto a sheet, are widely used. Sheet drying apparatuses are known for heating and drying sheets (paper) on which ink has been adhered by inkjet recording apparatuses.

In the sheet drying apparatus, a drying portion may become hot while drying ink quickly. If meanwhile a sheet jams (paper is stuck) near the drying portion, the user may be burnt by inserting a hand into the drying portion to remove the jammed sheet.

SUMMARY

According to one aspect of the present disclosure, a sheet drying apparatus includes a conveyance portion, a drying portion, a main body frame, an exterior cover, an inner cover, a locking mechanism, a temperature sensor, and a control portion. The conveyance portion conveys a sheet on which an image has been formed with ink containing moisture. The drying portion is arranged opposite the conveyance portion and heats and dries the sheet. The main body frame accommodates the conveyance portion and the drying portion. The exterior cover is attached to the main body frame so as to be openable and closable. The inner cover is arranged between the exterior cover and the drying portion so as to be openable and closable. In a closed state, the inner cover restricts access to the drying portion; in an open state, the inner cover allows access to the drying portion. The locking mechanism locks the inner cover in the closed state. The temperature sensor senses the temperature in the drying portion. The control portion controls the locking mechanism. The control portion makes the locking mechanism lock the inner cover in the closed state until the temperature in the drying portion sensed by the temperature sensor falls below a first temperature.

DETAILED DESCRIPTION

Figure 1:
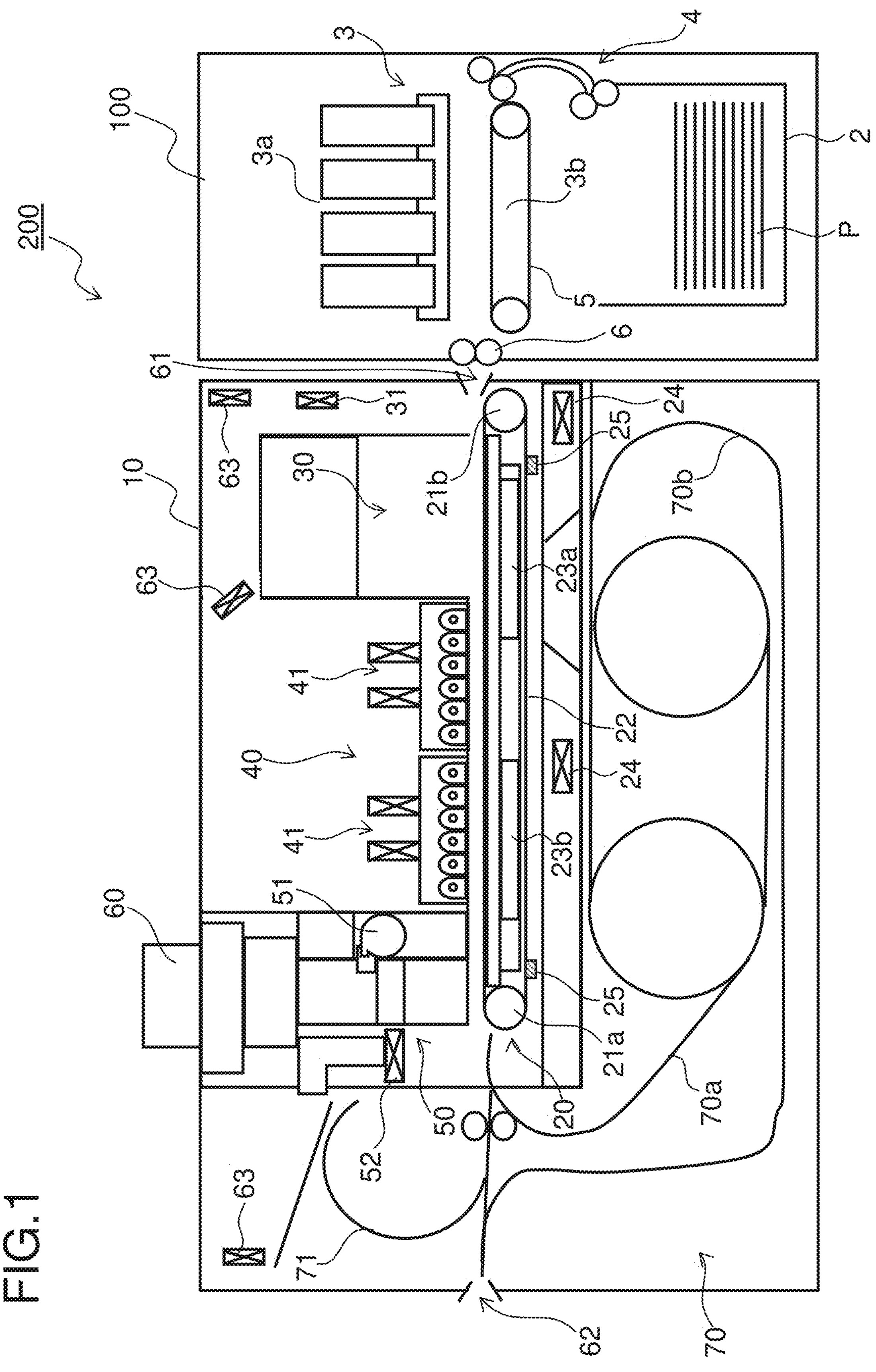
FIG. 1 is a schematic diagram showing the internal construction of an image forming system including a sheet drying apparatus of the present disclosure.
Figure 2:
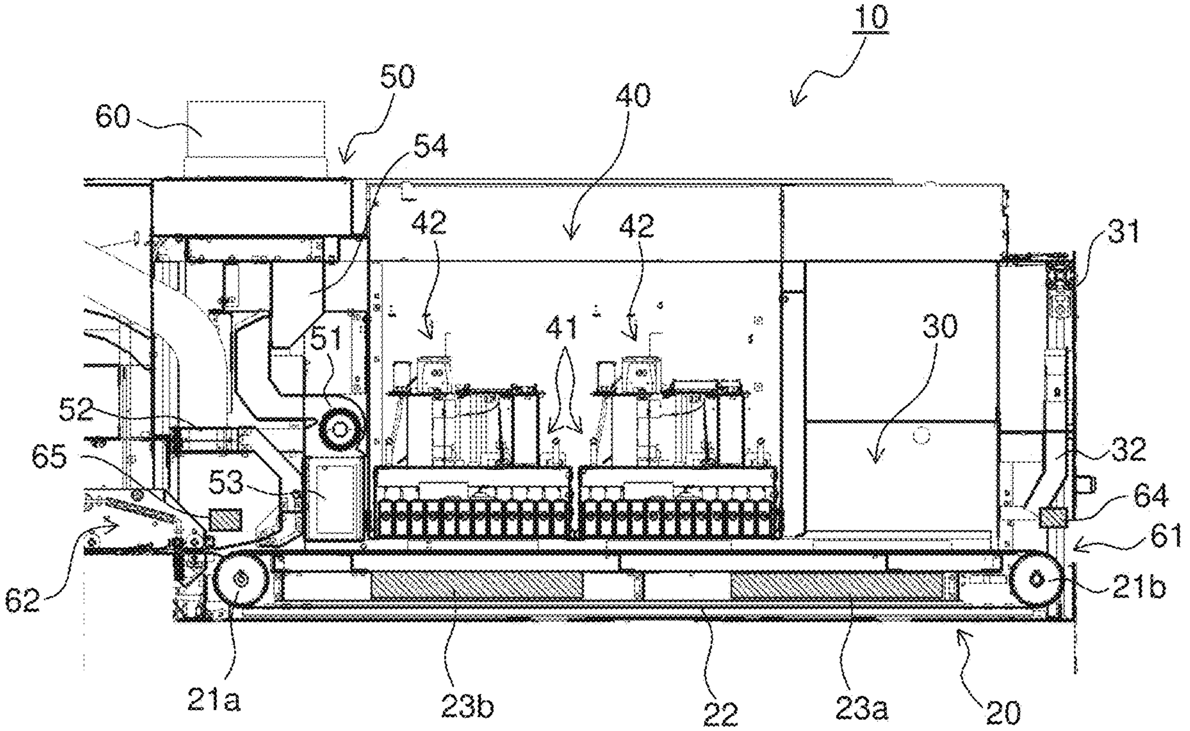
FIG. 2 is a side sectional view around a drying portion in a sheet drying apparatus according to one embodiment of the present disclosure.

1. Construction of an Image Forming System Including a Sheet Drying Apparatus: An embodiment of the present disclosure will be described below with reference to the accompanying drawings. FIG. 1 is a schematic diagram showing the internal construction of an image forming system 200 including a sheet drying apparatus 10 of the present disclosure. FIG. 2 is a side sectional view around a drying portion 40 in the sheet drying apparatus 10 according to one embodiment of the present disclosure. The image forming system 200 configured with an image forming apparatus 100 and the sheet drying apparatus 10 will be described with reference to FIGS. 1 and 2.

The image forming apparatus 100 is an inkjet recording printer and includes a sheet storage portion 2 arranged in a bottom part of the image forming apparatus 100, an image forming portion 3 arranged above the sheet storage portion 2, and a sheet feed portion 4 that feeds a sheet P stored in the sheet storage portion 2 to the image forming portion 3.

The image forming portion 3 is configured with a recording portion 3*a* having a plurality of recording heads and a print conveyance portion 3*b* arranged opposite the recording portion 3*a*. The print conveyance portion 3*b* includes an endless print conveyance belt 5 stretched around a plurality of rollers including a driving roller. The sheet P conveyed by the sheet feed portion 4 is conveyed below the recording portion 3*a* by being held under suction on the print conveyance belt 5 by a sheet suction portion (not shown) arranged inward of the print conveyance belt 5. The sheet P having a predetermined image recorded to it by the image forming portion 3 is discharged through a pair of discharge rollers 6 and is conveyed into the sheet drying apparatus 10.

The sheet drying apparatus 10 is arranged adjacent to the image forming apparatus 100 and dries the ink on the sheet P discharged from the image forming apparatus 100. The sheet drying apparatus 10 includes a first conveyance portion 20, a preliminary drying portion 30, a drying portion 40, a suction fan unit 50, and a second conveyance portion 70.

The first conveyance portion 20 includes a driving roller 21*a*, a driven roller 21*b*, and a conveyance belt 22. The conveyance belt 22 is stretched around the driving roller 21*a* arranged on the downstream side and the driven roller 21*b* arranged on the upstream side with respect to the conveyance direction of the sheet P (right to left direction in FIG. 1; hereinafter, referred to simply as the conveyance direction).

Inward of the conveyance belt 22 is arranged sheet suction portions 23*a* and 23*b*. In the conveyance belt 22, many suction holes (not shown) are formed through which to pass suction air for sucking the sheet P onto the conveyance belt 22 by negative pressure suction by the sheet suction portions 23*a* and 23*b*.

Belt cooling fans 24 are arranged at two places below the conveyance belt 22. A belt temperature sensor 25 is arranged adjacent to a bottom face of the conveyance belt 22. The belt cooling fan 24 blows cooling air to the conveyance belt 22 when the sensed temperature of the belt temperature sensor 25 reaches or exceeds a predetermined temperature.

The preliminary drying portion 30 is arranged closely downstream of a sheet introduction port 61 with respect to the conveyance direction and preliminarily dries the ink on the sheet P conveyed in through the sheet introduction port 61. The preliminary drying portion 30 includes a sheet blowing fan 31 and a sheet blowing duct 32 for blowing air from above the sheet P.

The drying portion 40 is arranged adjacently downstream of the preliminary drying portion 30 with respect to the conveyance direction and dries the ink on the sheet P having passed through the preliminary drying portion 30. The drying portion 40 includes two heating units 41 arranged on a top surface of the conveyance belt 22 so as to face each other.

The suction fan unit 50 sucks in the water vapor emanating from the sheet P passing through the drying portion 40. The suction fan unit 50 includes a suction fan 51 that sucks in air containing water vapor inside the drying portion 40 and a separation fan 52 that blows separation air for separating the sheet P from the conveyance belt 22. The suction fan unit 50 communicates with a space between the conveyance belt 22 and the heating unit 41 via a first duct 53 and communicates with an exhausting port 60 formed in a top part of the sheet drying apparatus 10 via a second duct 54.

A plurality of ambient air intake fans 63 for taking in ambient air into the sheet drying apparatus 10 are arranged at appropriate places in the sheet drying apparatus 10. In an upstream and a downstream part of the first conveyance portion 20 are arranged sheet detection sensors 64 and 65. The sheet detection sensors 64 and 65 detect the sheet P having passed through the sheet introduction port 61 and the sheet discharge port 62.

As, by being driven to rotate by the driving roller 21*a*, the conveyance belt 22 rotates in the counterclockwise direction, the sheet P conveyed in through the sheet introduction port 61 passes through the preliminary drying portion 30 and then through the drying portion 40 to be discharged through the sheet discharge port 62 out of the sheet drying apparatus 10 or conveyed into the second conveyance portion 70.

The second conveyance portion 70 is arranged below the drying portion 40 and the preliminary drying portion 30 across the first conveyance portion 20. The second conveyance portion 70 includes a reversing conveyance passage 70*a*, for reversing top side down the sheet P on which the ink has been dried, and a duplex conveyance passage 70*b*, for returning, when duplex printing is performed on the sheet P, the sheet P reversed top side down to the image forming apparatus 100.

Downstream (left side in FIG. 1) of the suction fan unit 50 with respect to the conveyance direction is provided a retraction path 71 in the shape of an arc. The retraction path 71 is where a sheet P (waste sheet) that has become useless due to a printing defect or the like in the image forming apparatus 100 is retracted and stored.

Figure 3:
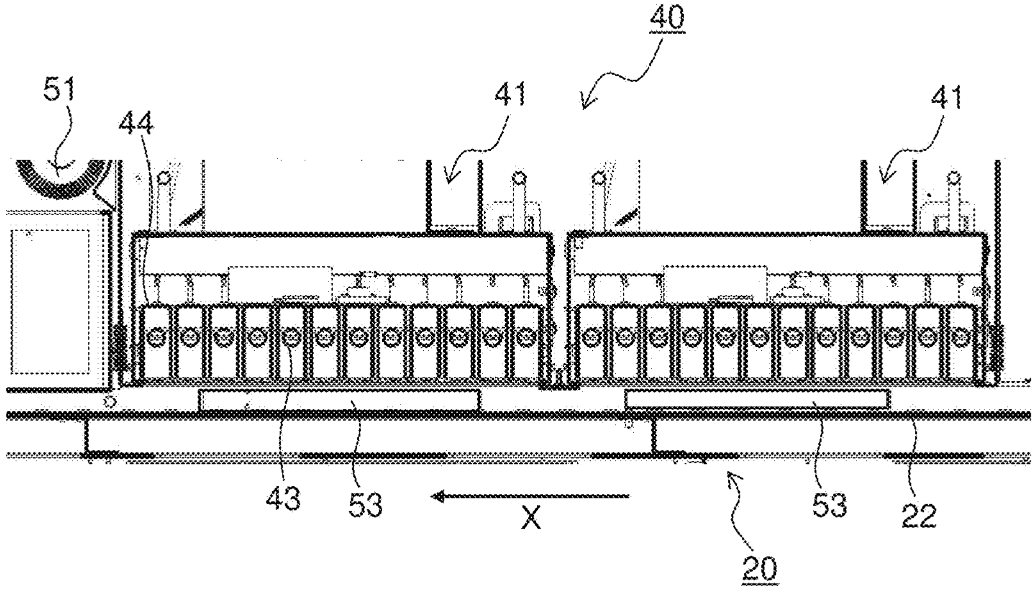
FIG. 3 is an enlarged view of the drying portion in FIG. 2.

2. Construction of the Sheet Drying Apparatus: FIG. 3 is an enlarged view of the drying portion 40 in FIG. 2. The drying portion 40 includes a heating unit 41 and a hot air fan 42 (see FIG. 2). Two heating units 41 are arranged along the conveyance direction (arrow-X direction). The heating unit 41 includes a heater 43 and a reflector 44. The heating unit 41 is movable between a heating position (the position in FIG. 3) facing the conveyance belt 22 and a retracted position (see FIG. 10) away from the conveyance belt 22.

The heater 43 is in the shape of a bar extending in the sheet width direction (the direction orthogonal to the plane in FIG. 3; hereinafter, referred to simply as the width direction) horizontally orthogonal to the conveyance direction. In the heating unit 41, a plurality (12 in this embodiment) of heaters 43 are arranged side by side along the conveyance direction. In this embodiment, an infrared heater is used as the heater 43.

The reflector 44 is a reflector plate U-shaped as seen in a side view arranged so as to surround the heater 43 from above. The infrared rays emitted from the heater 43 are reflected downward by the inner surface of the reflector 44 and are shone onto the sheet P carried and conveyed on the conveyance belt 22. Thus, the moisture in the ink on the sheet P evaporates and the ink dries; thus, the ink is fixed to the sheet P.

The hot air fan 42 is arranged above the heating unit 41. More specifically, the hot air fan 42 is arranged so as to blow air from above toward the reflectors 44. The air blown from the hot air fan 42 onto the reflectors 44 is heated as it passes through the gaps between the reflectors 44 become hot air to flow into the gap (drying space) between the heating unit 41 and the conveyance belt 22.

If steam or water vapor is present in the gap between the heating unit 41 and the conveyance belt 22, the infrared rays emitted from the heater 43 and reflected from the reflector 44 are absorbed by the steam or water vapor and this impairs their ability to dry the ink on the sheet P. Thus, by operating the hot air fan 42 to blow hot air into the gap between the heating unit 41 and the conveyance belt 22 and scattering and removing the steam or water vapor emanating from the sheet P, it is possible to maintain the drying properties of the ink under infrared rays.

Between the drying portion 40 and the suction fan unit 50, a first duct 53 is provided for sucking the steam or water vapor emanating from the sheet P together with air. The first duct 53 extends from the gap between the heating unit 41 and the conveyance belt 22 to the suction fan 51 in the suction fan unit 50.

Figure 4:
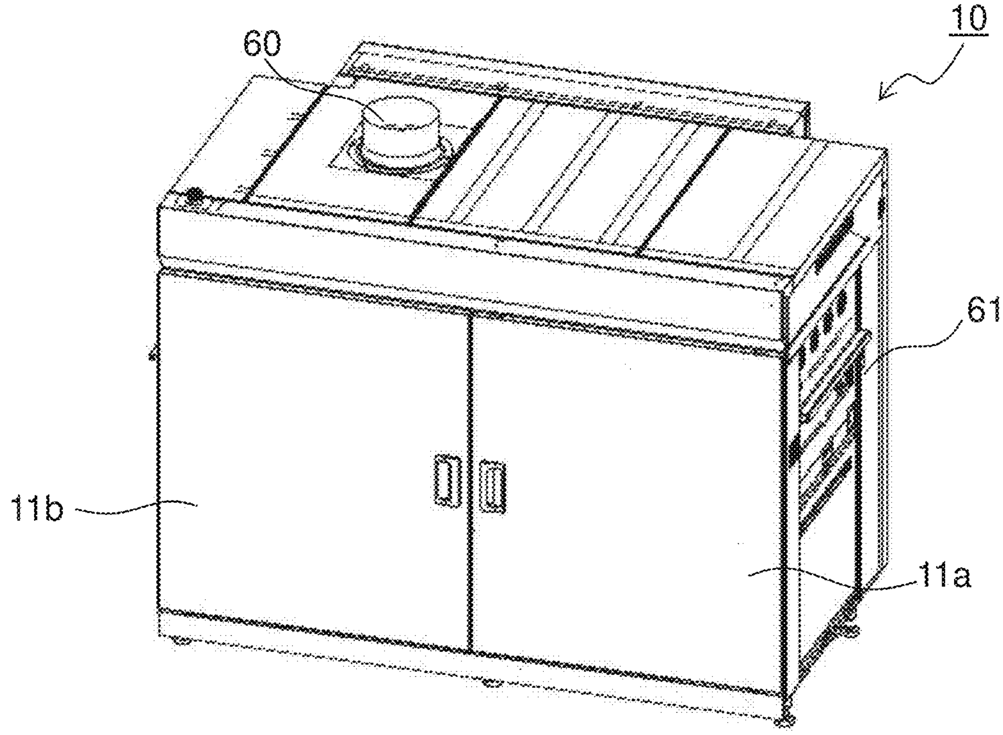
FIG. 4 is an exterior perspective view of the sheet drying apparatus according to the embodiment.
Figure 5:
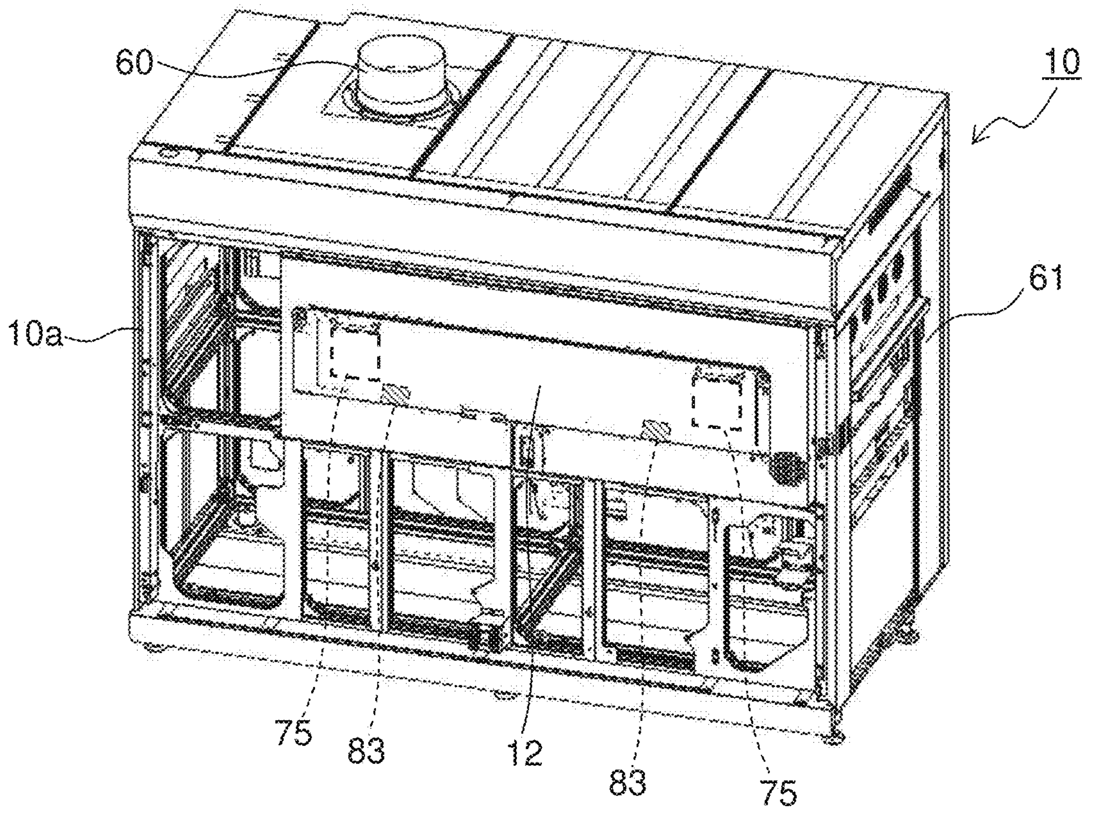
FIG. 5 is an exterior perspective view of the sheet drying apparatus with exterior covers removed from the state in FIG. 4.

3. Structure of an Inner Cover and a Locking Mechanism of the Sheet Drying Apparatus: FIG. 4 is an exterior perspective view of a sheet drying apparatus 10 according to this embodiment. FIG. 5 is an exterior perspective view of the sheet drying apparatus 10 with exterior covers removed from the state in FIG. 4.

As shown in FIG. 4, at the front of the sheet drying apparatus 10, exterior covers 11*a* and 11*b* are provided. The exterior covers 11*a* and 11*b* are each supported on a main body frame 10*a* (see FIG. 5) so as to be pivotable about one end of it in the left-right direction. More specifically, the exterior cover 11*a* is opened rightward with its right end as a pivot. The exterior cover 11*b* is opened leftward with its left end as a pivot.

As shown in FIG. 5, inside the exterior covers 11*a* and 11*b*, an inner cover 12 is provided. The inner cover 12 is opened and closed in the up-down direction with its lower end as a pivot. Closing the inner cover 12 as in FIG. 4 restricts access to the preliminary drying portion 30 and the drying portion 40 (see FIG. 2). Inside the inner cover 12 are arranged a drying portion temperature sensor 83 and a locking mechanism 75.

The drying portion temperature sensor 83 senses the temperature inside the drying portion 40. The result of sensing is transmitted to a control portion 90 (see FIG. 7). The drying portion temperature sensors 83 is provided one at each of two places facing two heating units 41 (see FIG. 3) near a lower end part of the inner cover 12.

Figure 6:
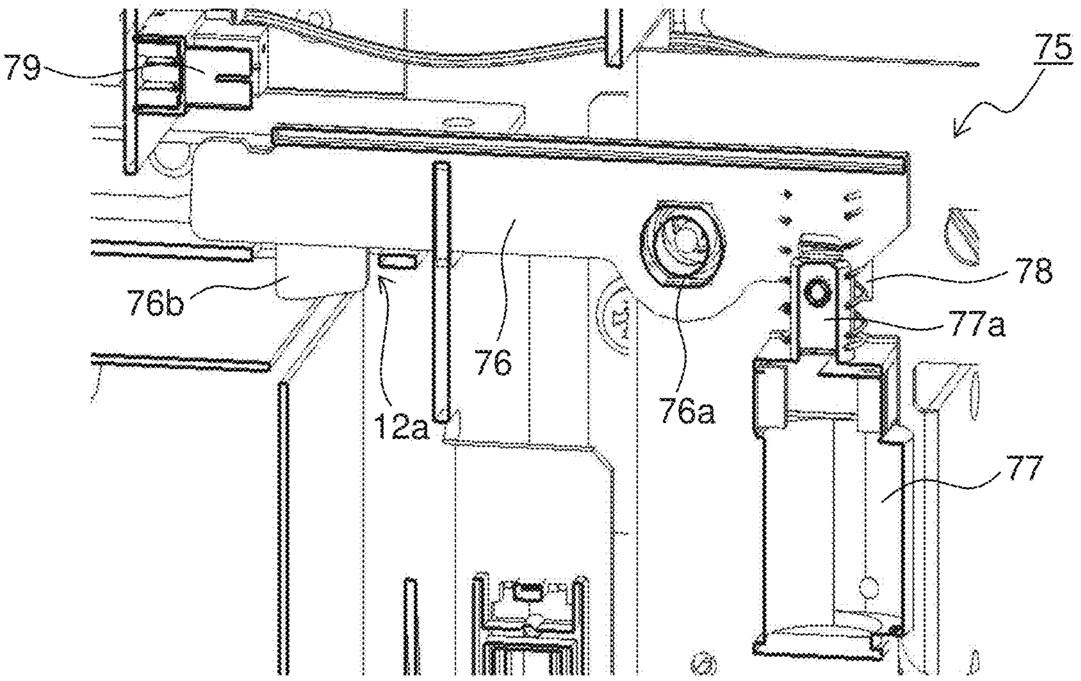
FIG. 6 is a perspective view of a locking mechanism for an inner cover.

FIG. 6 is a perspective view of the locking mechanism 75 for the inner cover 12. The locking mechanism 75 is provided one at each of two places, left and right, along the pivot end (upper end) of the inner cover 12. The locking mechanism 75 has a locking arm 76, a solenoid 77, and a compression spring 78.

The locking arm 76 is swingably supported about a swing shaft 76*a*. On a swinging end part (left end part in FIG. 6) of the locking arm 76, an engagement projection 76*b* is formed. The solenoid 77 has a plunger 77*a* that is movable back and forth in the up-down direction. The plunger 77*a* is coupled to an end part of the locking arm 76 opposite from the engagement projection 76*b* across the swing shaft 76*a*. The compression spring 78 is arranged between the locking arm 76 and the solenoid 77 while being fitted around the plunger 77*a*.

FIG. 6 shows a state where the inner cover 12 is locked, with the solenoid 77 non-energized and the plunger 77*a* projecting from the solenoid 77. In this state, the urging force of the compression spring 78 urges the locking arm 76 in the counterclockwise direction and the engagement projection 76*b* engages with an engagement hole 12*a* formed in a rear part of the inner cover 12. This restricts the opening of the inner cover 12.

When the solenoid 77 is energized, the plunger 77*a* is pulled into the solenoid 77. As a result, the locking arm 76 swings in the clockwise direction against the urging force of the compression spring 78 and the engagement projection 76*b* disengages from the engagement hole 12*a*. This makes the inner cover 12 openable.

Near the swinging end of the locking arm 76, a locking detection sensor 79 is arranged. The locking detection sensor 79 is an optical sensor (photo interrupter) that includes a detection portion having a light-emitting portion and a light-receiving portion. In a state in FIG. 6, the detection portion of the locking detection sensor 79 is not shielded from light by the locking arm 76 and the inner cover 12 is detected as locked by the locking mechanism 75. When the locking arm 76 swings in the clockwise direction from the state in FIG. 6 and the detection portion of the locking detection sensor 79 is shielded from light, the inner cover 12 is detected as unlocked.

Figure 7:
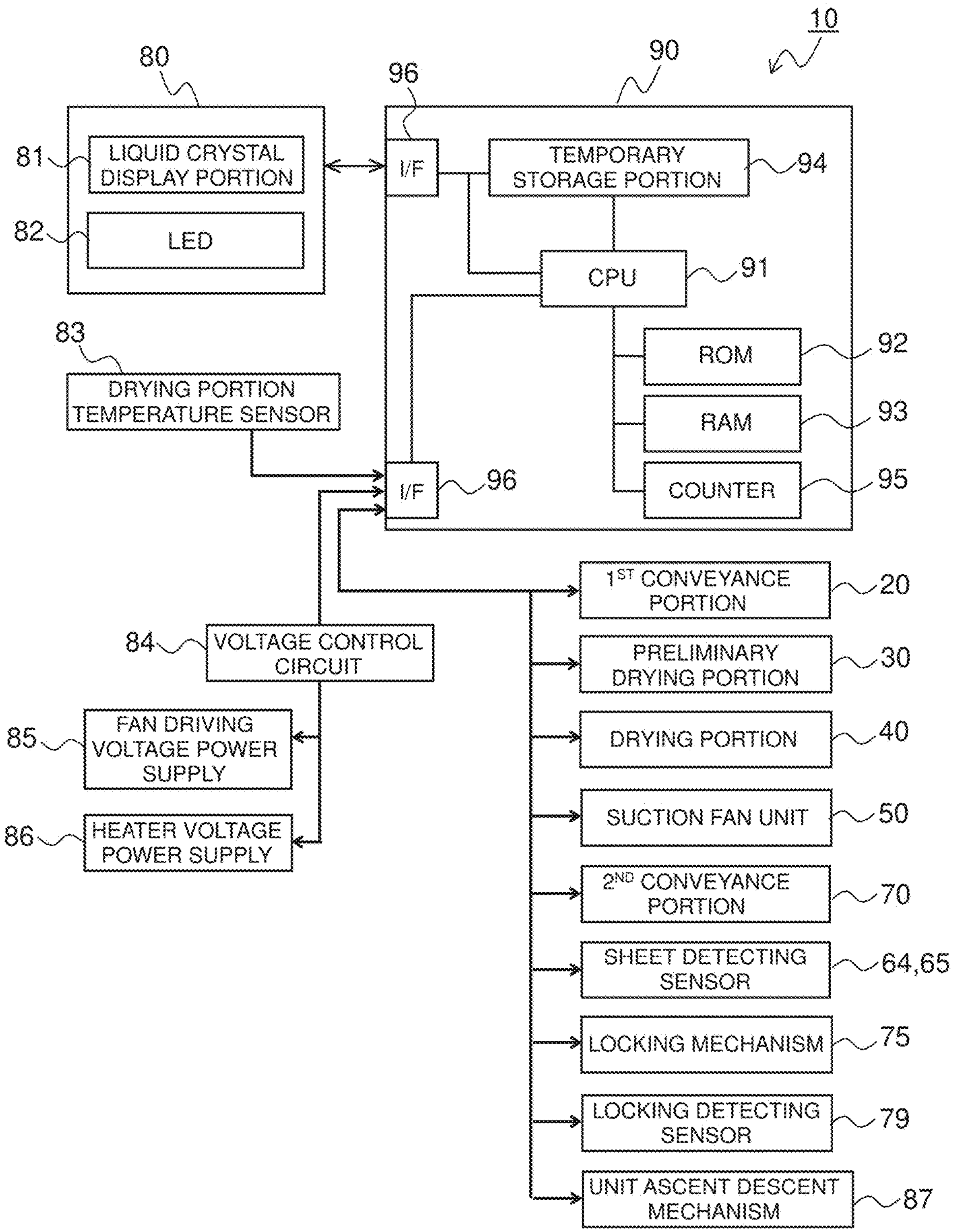
FIG. 7 is a block diagram showing one example of control paths in the sheet drying apparatus.

FIG. 7 is a block diagram showing one example of control paths in the sheet drying apparatus 10 of this embodiment. For simplicity's sake, the following description will focus on those control paths in the sheet drying apparatus 10 that are necessary for implementing the present disclosure.

A control portion 90 at least includes a CPU (central processing unit) 91 as a central arithmetic processor, a ROM (read-only memory) 92 as a read-only storage portion, a RAM (random-access memory) 93 as a readable and rewritable storage portion, a temporary storage portion 94 that temporarily stores data required for controlling different parts of the sheet drying apparatus 10, and a plurality of (here, two) I/Fs (interfaces) 96 that transmit control signals to different blocks in the sheet drying apparatus 10 and receive input signals from an operation portion 80.

The ROM 92 stores a control program for the sheet drying apparatus 10 as well as data that are not changed during the use of the sheet drying apparatus 10, such as values necessary for control. The RAM 93 stores necessary data generated in controlling the sheet drying apparatus 10, data temporarily required in controlling the sheet drying apparatus 10, and the like. The RAM 93 (or the ROM 92) also stores, for use in controlling the position of the reflector 44, the relationship between the print ratio of the image formed on the sheet P and the arrangement of the reflector 44. The counter 95 counts the cumulative number of sheets P that have been conveyed.

The control portion 90 transmits control signals from the CPU 91 via the I/Fs 96 to different parts and blocks in the sheet drying apparatus 10. From those parts and blocks, signals indicating their states and input signals are transmitted via the I/Fs 96 to the CPU 91. Examples of the parts and blocks controlled by the control portion 90 include the first conveyance portion 20, the preliminary drying portion 30, the drying portion 40, the suction fan unit 50, the second conveyance portion 70, the operation portion 80, a unit ascent-descent mechanism 87, and the like.

A voltage control circuit 84 is connected to a fan driving voltage power supply 85 and to a heater voltage power supply 86 and, according to output signals from the control portion 90, operates these power supplies. According to control signals from the voltage control circuit 84, the fan driving voltage power supply 85 applies a predetermined voltage to the hot air fan 42 in the heating unit 41 and the heater voltage power supply 86 applies a predetermined voltage to the heater 43 in the heating unit 41.

The operation portion 80 includes a liquid crystal display portion 81 and LEDs 82 that indicate various states. A user operates a stop/clear button on the operation portion 80 to stop the drying of the sheet P and operates a reset button on it to bring various settings for the sheet drying apparatus 10 to default ones. The liquid crystal display portion 81 indicates the status of the sheet drying apparatus 10 and displays the progress of the drying of the sheet P and the number of sheets P that have been introduced. Various settings for the sheet drying apparatus 10 may be made via an input portion 101 on the image forming apparatus 100.

Figure 10:
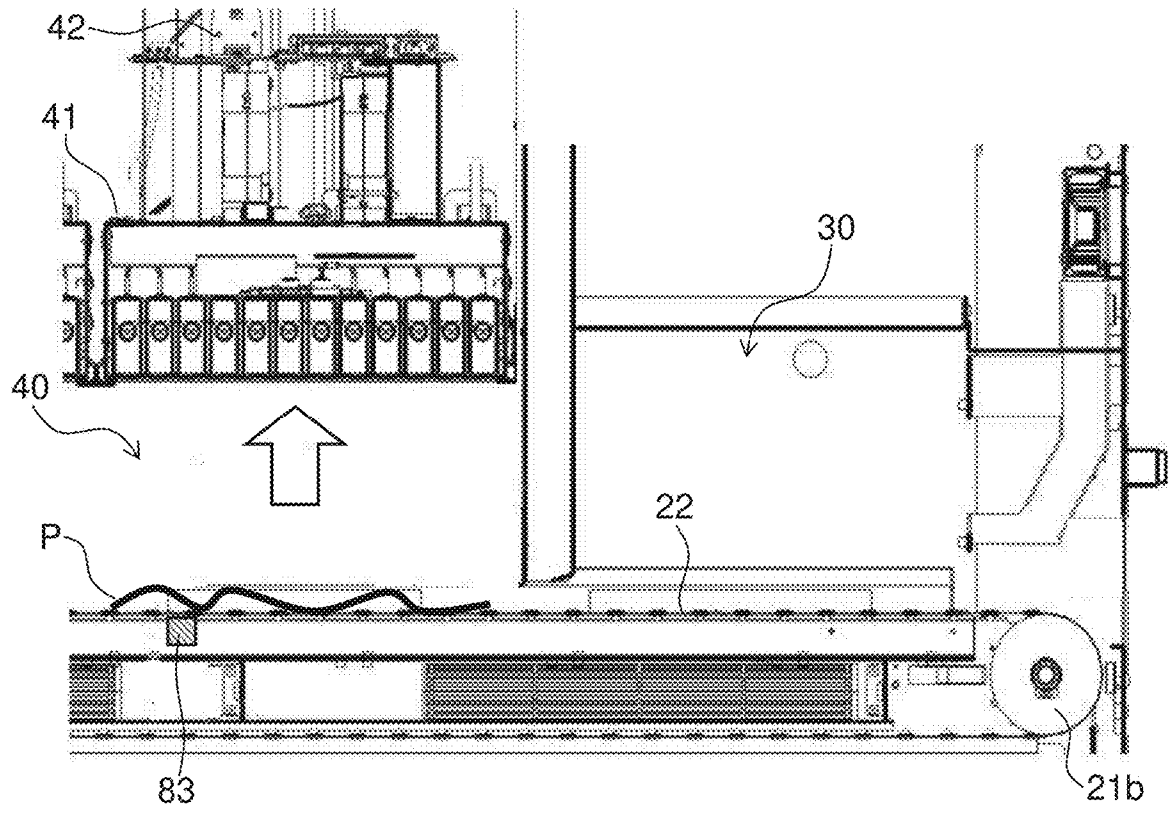
FIG. 10 is a diagram showing a state in which a heating unit has been raised from the state in FIG. 9.

The unit ascent-descent mechanism 87 moves the heating unit 41 in the drying portion 40 between the heating position (see FIG. 3) and the retracted position (see FIG. 10). The unit ascent-descent mechanism 87 is configured with, for example, a conventionally known driving mechanism such as a rack and pinion mechanism or a wind-up pulley and a wire.

In this embodiment, based on the result of sensing by the drying portion temperature sensor 83, the locking mechanism 75 locks or unlocks the inner cover 12. More specifically, when the temperature in the drying portion 40 reaches or exceeds a predetermined temperature, the locking mechanism 75 locks the inner cover 12.

Figure 8:
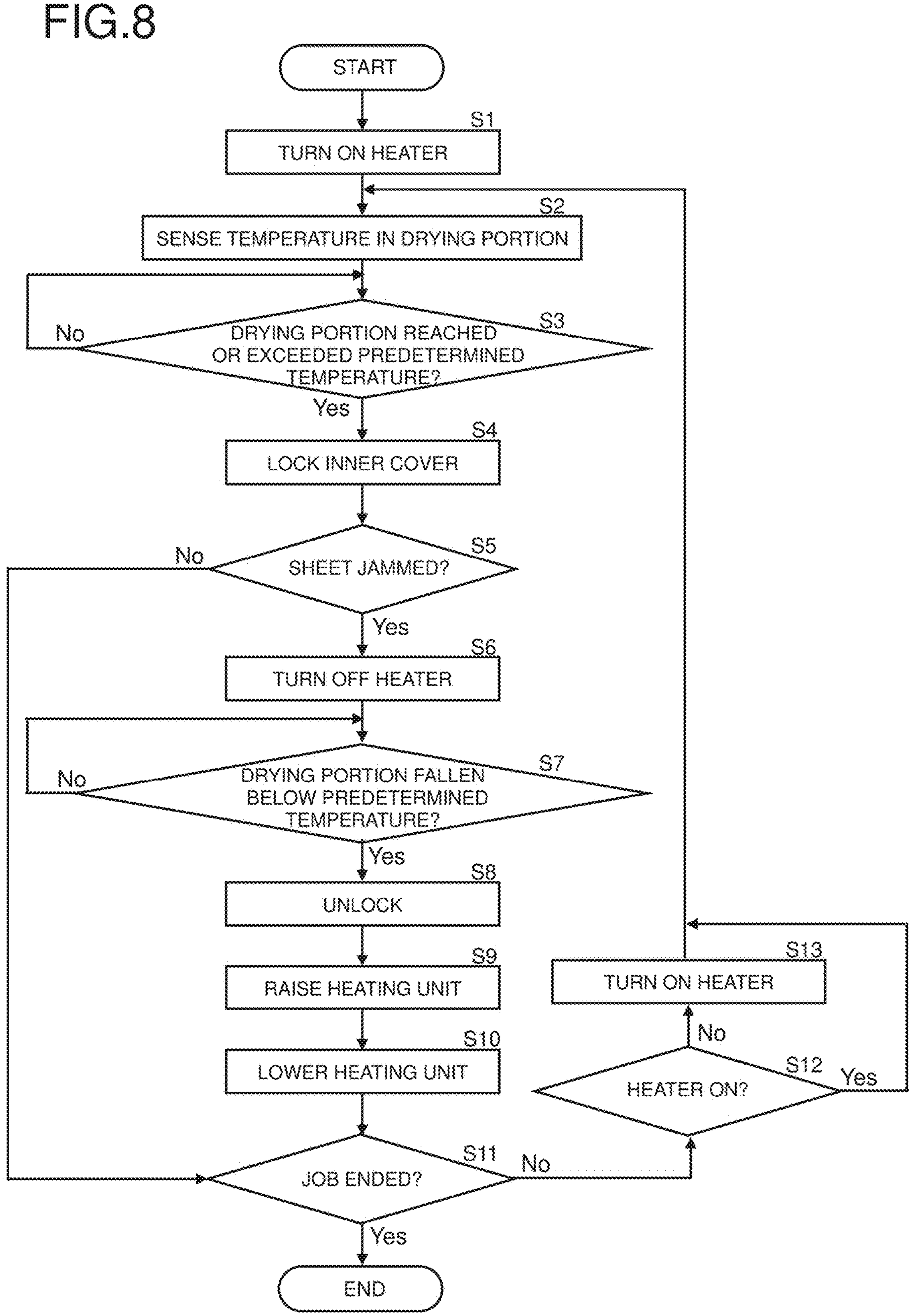
FIG. 8 is a flow chart showing an example of locking and unlocking control for the inner cover.

FIG. 8 is a flow chart showing an example of locking and unlocking control for the inner cover 12. Referring back to FIGS. 1 to 7 as necessary, and also to FIGS. 9 and 10, which will be referred to later, a procedure for locking and unlocking control for the inner cover 12 is described along the steps in FIG. 8.

Before a print job by the image forming apparatus 100 is started, the control portion 90 turns on the heater 43 in the drying portion 40 (Step S1). Then the drying portion temperature sensor 83 senses the temperature in the drying portion 40 (Step S2). The result of the sensing is transmitted to the control portion 90.

The control portion 90 checks whether the temperature in the drying portion 40 has reached or exceeded a predetermined temperature (for example, 42° C.) (Step S3). If it has reached or exceeded a predetermined temperature (Yes in Step S3), the locking mechanism 75 locks the inner cover 12 (Step S4). Then the print job by the image forming apparatus 100 is started and sheets P start to be conveyed into the sheet drying apparatus 10. After that, the control portion 90 checks whether a sheet P has jammed (paper has stuck) in the drying portion 40 (Step S5).

Figure 9:
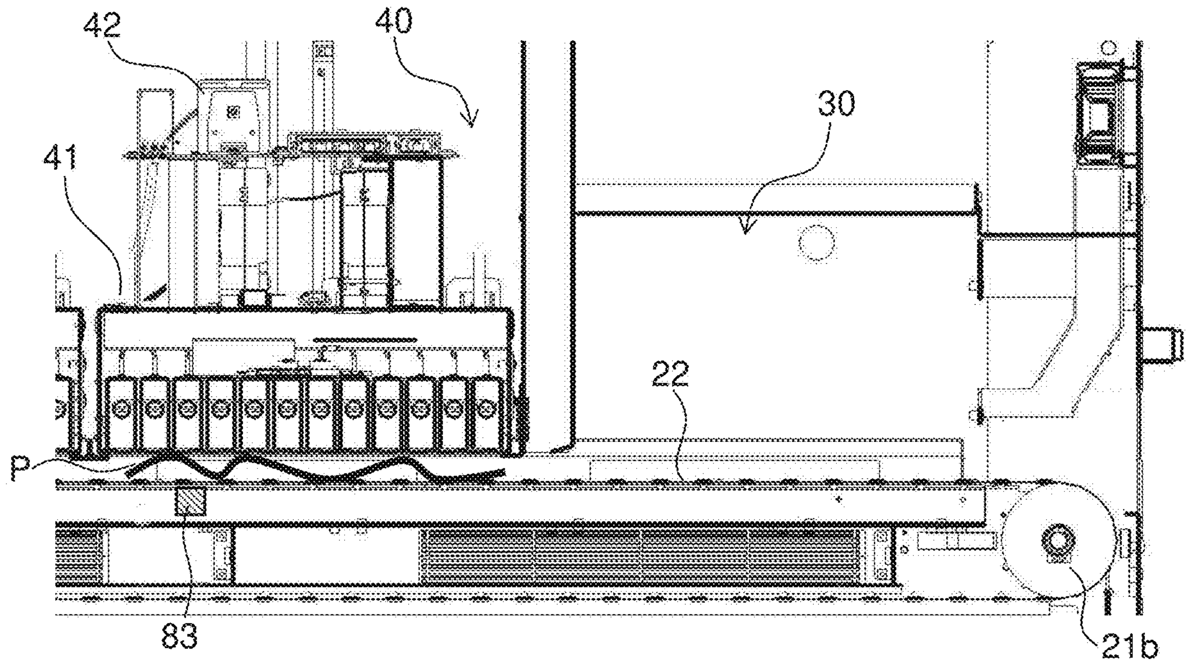
FIG. 9 is a side sectional view showing a state in which a sheet has jammed in the drying portion in the sheet drying apparatus.

FIG. 9 is a side sectional view showing a state in which a sheet P has jammed in the drying portion 40. As shown in FIG. 9, if a sheet P jams between the heating unit 41 in the drying portion 40 and the conveyance belt 22, the sheet P does not reach the sheet detection sensor 65 (see FIG. 2). Thus, after the sheet P passes across the sheet detection sensor 64 (see FIG. 2), if the sheet P is not sensed by the sheet detection sensor 65 after a predetermined period of time, a jam is judged to be occurring. If a sheet P jams (Yes in Step S5), the control portion 90 turns the heater 43 off (Step S6).

Next, the control portion 90 checks whether the temperature in the drying portion 40 has fallen below a predetermined temperature (for example, 42° C.) (Step S7). If it has fallen below the predetermined temperature (Yes in Step S7), the locking mechanism 75 unlocks the inner cover 12 (Step S8). At the same time, the heating unit 41 is raised to perform jam removal for the sheet P (Step S9).

FIG. 10 is a diagram showing a state in which the heating unit 41 has been raised to the retracted position from the state in FIG. 9. When the temperature in the drying portion 40 has fallen below the predetermined temperature, as shown in FIG. 10, the unit ascent-descent mechanism 87 raises the heating unit 41 from the heating position to the retracted position. This makes it easy to remove the sheet P. When jam removal for the sheet P ends and the inner cover 12 is closed, the control portion 90 makes the unit ascent-descent mechanism 87 lower the heating unit 41 back to the heating position (Step S10).

If no sheet P has jammed in Step S5 (No in Step S5), with the heater 43 kept on, the image forming apparatus 100 continues with the print job and the conveyance of the sheet P into the sheet drying apparatus 10.

After that, the control portion 90 checks whether the print job has ended (Step S11). If the print job continues (No in Step S11), it is checked whether the heater 43 is on (Step S12). If the heater 43 is off in Step S6 (No in Step S11), the heater 43 is turned back on (Step S13).

Then, a return is made to step S2, and after that, similar steps are repeated (steps S2 to S11). If the print job has ended (Yes in Step S11), the heater 43 is turned off and the procedure is ended.

With the configuration according to this embodiment, when the temperature in the drying portion 40 reaches or exceeds a predetermined temperature, the inner cover 12 is locked. This helps reliably prevent the user from being burnt by inserting a hand into the hot drying portion 40 when a jam has occurred in the drying portion 40.

When the temperature in the drying portion 40 has fallen below a predetermined temperature, the inner cover 12 is unlocked and at the same time the heating unit 41 is raised to the retracted position. This makes it easy to remove the jammed sheet P and helps reduce the time for jam removal.

The inner cover 12 restricts access to the drying portion 40 and the preliminary drying portion 30, so even if the inner cover 12 is locked, it is possible to access parts other than the drying portion 40 and the preliminary drying portion 30. Thus, if a sheet P jams outside the drying portion 40 and the preliminary drying portion 30, jam removal can be performed immediately and this helps reduce the time for jam removal.

In the example of control shown in FIG. 8, the inner cover 12 is unlocked (Step S8) and at the same time the heating unit 41 is raised (Step S9); instead, the heating unit 41 may be raised before the inner cover 12 is unlocked. For example, immediately when a jam of a sheet P is sensed the heating unit 41 may be raised to the retracted portion. Thus, the heating unit 41 has already risen to the retracted position when the inner cover 12 is unlocked and this helps reduce the time for jam removal.

In the example of control shown in FIG. 8, the inner cover 12 is locked when the temperature in the drying portion 40 reaches or exceeds a predetermined temperature (42° C.) and the inner cover 12 is unlocked when the temperature in the drying portion 40 has fallen below a predetermined temperature (42° C.). Here, the threshold temperature at which the inner cover 12 is locked (first temperature) and the threshold temperature at which the inner cover 12 is unlocked (second temperature) do not have to be the same.

For example, the second temperature can be set to be lower than the first temperature (for example, 40° C.) to increase safety during jam removal for the sheet P. The second temperature can be set to be higher than the first temperature (for example, 45° C.) to reduce the time until jam removal becomes possible. If the second temperature is set to be higher than the first temperature, the temperature should be set such that the user will not be burnt.

The present disclosure can be implemented in any manner other than as in the embodiment described above, and allows for any modifications without departure from the spirit of the present disclosure. For example, in the embodiment described above, a jam is sensed based on the timing of the sensing of the sheet P at the sheet detection sensors 64 and 65; instead, a dedicated jam sensing sensor may be arranged in the drying portion 40.

While the embodiment described above deals with, as an example of the image forming system 200, a configuration where the sheet drying apparatus 10 is coupled to an inkjet printer as an image forming apparatus 100, needless to say, the sheet drying apparatus 10 can be used independently without being coupled to the image forming apparatus 100.

The present disclosure finds applications in sheet drying apparatuses that dry sheets on which images have been printed in inkjet recording apparatuses and the like. Based on the present disclosure, it is possible to provide a sheet drying apparatus that can prevent the user from being burnt by inserting a hand into a hot drying portion during jam removal and the like in the drying portion, and to provide an image forming system provided with such a sheet drying apparatus.

What is claimed is:

1. A sheet drying apparatus comprising:
- a conveyance portion that conveys a sheet on which an image has been formed with ink containing moisture;
- a drying portion arranged opposite the conveyance portion, the drying portion heating and drying the sheet;
- a main body frame that accommodates the conveyance portion and the drying portion;
- an exterior cover that can be opened and closed, the exterior cover being attached to the main body frame;
- an inner cover that can be opened and closed between the exterior cover and the drying portion, the inner cover in a closed state restricting access to the drying portion, the inner cover in an open state allowing access to the drying portion;
- a locking mechanism that locks the inner cover in the closed state;
- a temperature sensor that senses a temperature in the drying portion; and
- a control portion that controls the locking mechanism, wherein the sheet drying apparatus further includes:

a preliminary drying portion arranged adjacently upstream of the drying portion with respect to a conveyance direction of the sheet, the preliminary drying portion preliminarily drying the sheet, when the inner cover is in the closed state, access is possible to the conveyance portion other than the drying portion and the preliminary drying portion, and the control portion makes the locking mechanism lock the inner cover in the closed state until the temperature in the drying portion sensed by the temperature sensor falls below a first temperature.

2. The sheet drying apparatus according to claim 1, further comprising:

a heater arranged in the drying portion, the heater heating the sheet; and a heater voltage supply that energizes the heater, wherein the control portion makes the locking mechanism lock the inner cover in the closed state when the heater is energized or the temperature in the drying portion reaches or exceeds the first temperature, and the locking mechanism unlock the inner cover when the temperature in the drying portion reaches a second temperature lower than the first temperature.

3. The sheet drying apparatus according to claim 2, wherein the drying portion includes:

a heating unit that can be raised and lowered between a heating position in which the heating unit is arranged opposite the conveyance portion and heats the sheet with the heater and a retracted position in which the heating unit is arranged away from the conveyance portion, and a unit ascent-descent mechanism that raises and lowers the heating unit, wherein when a jam of the sheet is sensed between the conveyance portion and the heating unit, the control portion makes the unit ascent-descent mechanism raise the heating unit from the heating position to the retracted position at a same time that the inner cover is unlocked, or before the inner cover is unlocked.

4. An image forming system comprising:

an image forming apparatus that forms an image on a sheet with ink containing moisture; and the sheet drying apparatus according to claim 1 that is coupled to the image forming apparatus at a downstream side thereof in a conveyance direction of the sheet, the sheet drying apparatus drying the sheet having an image formed thereon by the image forming apparatus.

* * * * *